United States Patent
Downare et al.

(10) Patent No.: US 10,597,862 B1
(45) Date of Patent: Mar. 24, 2020

(54) STORM DRAIN FILTER AND METHOD OF INSTALLATION

(71) Applicants: Ashtin Q. Downare, Fort Myers, FL (US); Richard Tab Downare, Fort Myers, FL (US)

(72) Inventors: Ashtin Q. Downare, Fort Myers, FL (US); Richard Tab Downare, Fort Myers, FL (US)

(*) Notice: Subject to any disclaimer, the term of this patent is extended or adjusted under 35 U.S.C. 154(b) by 0 days.

(21) Appl. No.: 15/674,698

(22) Filed: Aug. 11, 2017

Related U.S. Application Data

(60) Provisional application No. 62/494,537, filed on Aug. 12, 2016.

(51) Int. Cl.
| | |
|---|---|
| *E03F 5/04* | (2006.01) |
| *E03F 5/16* | (2006.01) |
| *C02F 1/00* | (2006.01) |
| *E03F 5/046* | (2006.01) |
| *C02F 103/00* | (2006.01) |

(52) U.S. Cl.
CPC ............ *E03F 5/0404* (2013.01); *C02F 1/001* (2013.01); *E03F 5/046* (2013.01); *E03F 5/16* (2013.01); *C02F 2103/001* (2013.01); *C02F 2201/004* (2013.01)

(58) Field of Classification Search
CPC ........ E03F 5/0401; E03F 5/0404; E03F 5/046
USPC ...... 210/162, 163, 170.03, 747.3; 404/2, 4, 5
See application file for complete search history.

(56) References Cited

U.S. PATENT DOCUMENTS

| | | | | |
|---|---|---|---|---|
| 4,594,157 A | * | 6/1986 | McGowan | E03F 5/06 210/163 |
| 6,017,166 A | * | 1/2000 | Mossburg, Jr. | E03F 5/0404 210/163 |
| 6,086,758 A | * | 7/2000 | Schilling | E03F 5/0404 404/4 |
| 6,106,707 A | * | 8/2000 | Morris | E03F 5/046 210/163 |
| 6,214,216 B1 | * | 4/2001 | Isaacson | E03F 5/0404 210/162 |
| 7,670,483 B2 | * | 3/2010 | Ringenbach | E03F 5/0404 210/163 |
| 2003/0047497 A1 | * | 3/2003 | Harris | E03F 5/0404 210/163 |
| 2003/0173277 A1 | * | 9/2003 | Shaw | E03F 5/0404 210/163 |
| 2004/0016692 A1 | * | 1/2004 | Sasaki | E03F 5/0404 210/473 |
| 2005/0183997 A1 | * | 8/2005 | Happel | E03F 5/0404 210/163 |
| 2012/0222995 A1 | * | 9/2012 | Sasaki | E03F 5/0404 210/163 |
| 2014/0238915 A1 | * | 8/2014 | McInnis | E03F 5/0404 210/170.03 |
| 2017/0145677 A1 | * | 5/2017 | Coppola | E03F 5/0404 |

* cited by examiner

*Primary Examiner* — Christopher Upton
(74) *Attorney, Agent, or Firm* — Edward M. Livingston, Esq.; Bryan L. Loeffler, Esq.; Livingston Loeffler, P.A.

(57) ABSTRACT

A storm drain filter (1) that is easily installable and removable from a curb style water inlet (20) of a storm drain (23) and that is effective in preventing debris and unwanted substances from entering storm drains by collecting the debris while allowing water to pass through into the storm drain.

1 Claim, 3 Drawing Sheets

STORM DRAIN FILTER AND METHOD OF INSTALLATION

CROSS-REFERENCE TO RELATED APPLICATION

This application claims priority to provisional patent application No. 62/494,537, filed on Aug. 12, 2016, which is currently pending. The patent application identified above is incorporated herein by reference in its entirety to provide continuity of disclosure.

FIELD OF THE INVENTION

The present invention relates generally to storm drains and devices used for preventing debris and other pollutants from entering storm drains having side or curb style inlets.

BACKGROUND OF THE INVENTION

A storm drain is designed to drain excess rain and ground water from impervious surfaces such as paved streets, parking lots and sidewalks. A side inlet is a type of storm drain located adjacent to a curb.

A common problem with side inlets is debris collected by rain and other runoff that enters the side inlets. This can occur on an average day-to-day basis with litter, yard waste and so forth and/or on a larger scale near construction sites where construction material can be washed into nearby drains. Conventional methods used to prevent debris and pollutants from entering storm drains, especially near construction sites, include devices that completely block the storm drains. Such devices include rock or sand bags. These devices may prevent debris from entering a storm drain, however, they also block water from entering the storm drain, thereby causing flooding and/or causing debris to be sent downstream, thereby scattering the debris.

An additional problem is the fact that conventional storm drain filters sit outside of the storm drains and thus, take up area in roads and other pathways and pose as safety hazards to passersby.

Therefore, a need exists for a storm drain filter that is easily installable and removable from a curb style storm water side inlet of a storm drain and that is effective in preventing debris and unwanted substances from entering storm drains by collecting the debris while allowing water to pass through into the storm drain.

SUMMARY OF THE INVENTION

The primary object of the present invention is to provide a storm drain filter that is easily installable and removable from a curb style storm water side inlet of a storm drain.

An additional object of the present invention is to provide a storm drain filter that is effective in preventing debris and unwanted substances from entering storm drains by collecting the debris while allowing water to pass through into the storm drain.

The present invention fulfills the above and other objects by providing a rectangular-shaped telescoping frame that supports a filter bag wherein top perimeter edges of the filter bag are secured to the frame. A width of the frame may be decreased or increased to accommodate various sized curb style storm water inlets. The frame and filter bag may be inserted into a side inlet and then expanded to fully fill the width of the storm drain inlet by resting side edges of the frame and filter bag against a side surface of the drain inlet. A front edge of the frame and filter bag rests on a bottom surface of the drain inlet while a rear edge of the frame and filter extend into the drain inlet and the storm drain. The front portion of the frame and filter bag are preferably secured to the bottom surface of the drain inlet using at least one securing mechanism, such as one or more clips, screws, concrete nails and/or equivalent securing mechanisms.

As water passes into the drain inlet, the water passes over the front edge of the frame and filter bag and falls into the filter bag where any debris being carried by the water is trapped as the water passes through the filter bag, which is preferably constructed out of a porous material, and into the storm drain.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
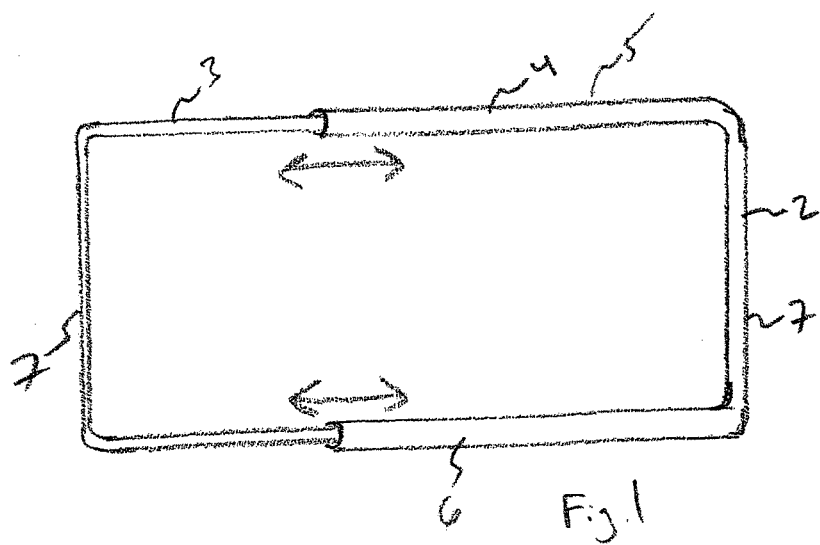
FIG. 1 is a top view of a rectangular-shaped telescoping frame of a storm drain filter of the present invention.
Figure 2:
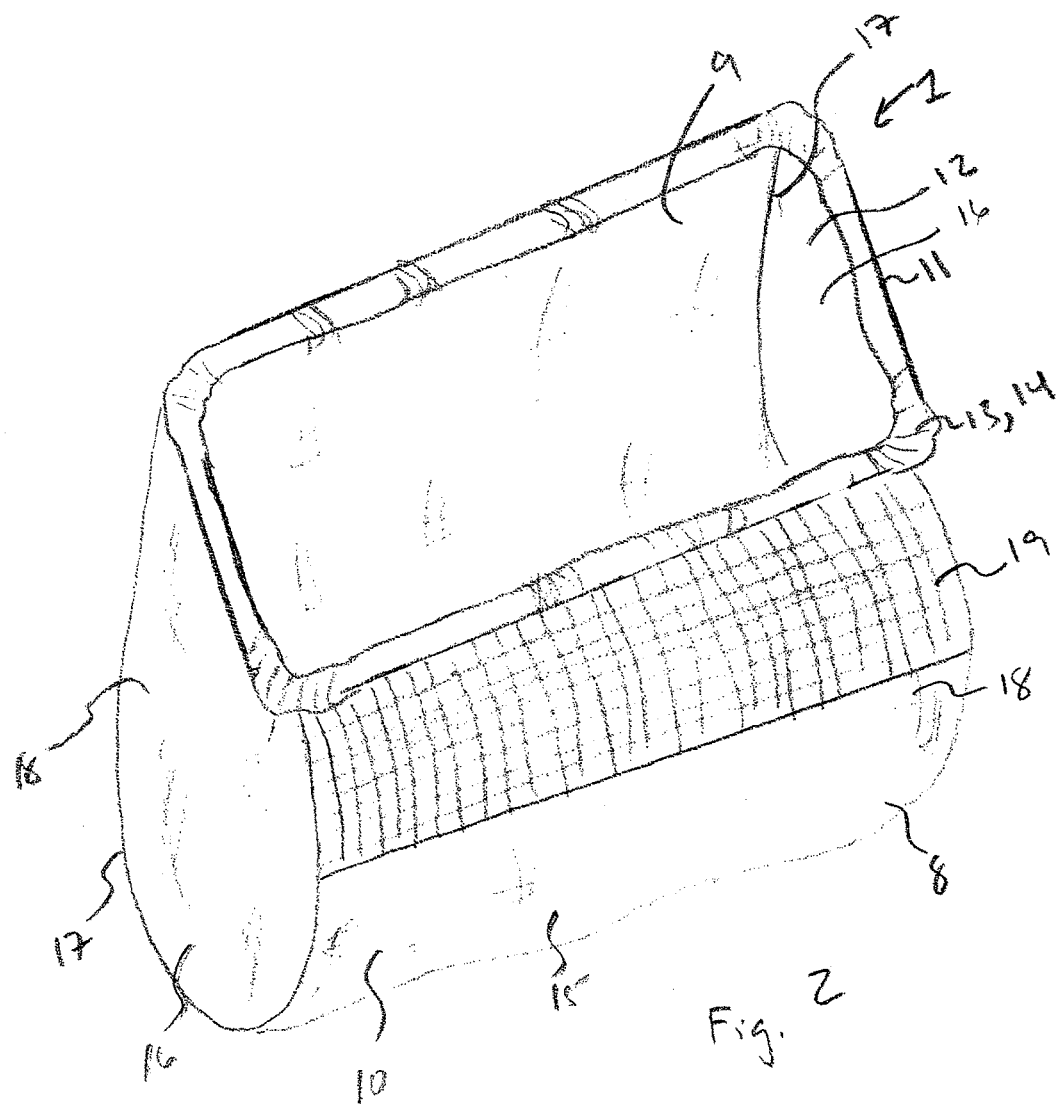
FIG. 2 is a perspective side view of a storm drain filter of the present invention

For purposes of describing the preferred embodiment, the terminology used in reference to the numbered accessories in the drawings is as follows:

1. storm drain filter, generally
2. frame
3. first U-shaped halve of frame
4. second U-shaped halve of frame
5. front edge of frame
6. rear edge of frame
7. side edge of frame
8. filter bag
9. inner surface of filter bag
10. outer surface of filter bag
11. upper perimeter edge of filter bag
12. opening of filter bag
13. attachment means
14. sleeve
15. main panel of filter bag
16. side panel of filter bag
17. side edge of main panel
18. cloth material
19. mesh panel
20. curb style side water inlet
21. side wall of water inlet
22. street surface
23. storm drain
24. front wall of storm drain
25. securing means
26. clip With reference to FIGS. 1 and 2, a top view of a rectangular-shaped telescoping frame 2 of a storm drain filter 1 of the present invention and a perspective side view of a storm drain filter 1 of the present invention, respectively, are illustrated. The storm drain filter 1 of the present invention comprises a rectangular-shaped telescoping frame 2 having a two U-shaped halves in which a first U-shaped halve 3 slides into a second U-shaped halve 4 to allow the width of the frame 2 to be increased or decreased. Said frame 2 comprises a front edge 5, a rear edge 6 and side edges 7. The frame 2 supports a filter bag 8 having an inner surface 9, an outer surface 10, and an upper perimeter edge 11 surrounding an opening 12 into the filter bag 8. The upper perimeter edge 11 of the filter bag 8 is attached to the frame 2 via at least one attachment means 13, such as at least one sleeve 14, stitching, at least one clip and/or equivalent attachment means. The upper perimeter edge 11 of the filter bag 8 is preferably attached to the frame 2 in a manner that allows frame 2 to slide in relation to the upper perimeter edge 11, thereby allowing the width of the telescoping frame 2 to be increased or decreased with the opening 12 of the filter bag 8. The filter bag 8 may further comprise a main panel 15 that extends from the front edge 5 of the frame 2 to the rear edge 6 of the frame 2 and side panels 16 that extend from side edges 17 of the main panel 15 to the side edges 7 of the frame 2, thereby allowing the filter bag 8 to drape over a front wall 24 of the storm drain 23, as illustrated in FIG. 4.

A main body of the filter bag 8 is preferably constructed out of a porous cloth material 18 and comprises at least one mesh panel 19 located thereon preferably below the upper perimeter edge 11 of the filter bag 8. The porous cloth material 18 allows water to drain but catches small debris and pollutants, such as oil, that a mesh would not trap. When there is an excess amount of water draining into a side inlet and filling the filter bag 8, the mesh panel 19 allows the water to drain before reaching the upper perimeter edge 11 of the filter bag 8, thereby preventing any trapped debris from flowing out of the filter bag 8. As illustrated in FIG. 2 and FIG. 4, a mesh panel 17 is located on the filter bag 8 directly below the rear edge 6 of the frame 2, thereby directing excess water to flow out of the rear portion of the filter bag 8 and into a storm drain 23.

Figure 3:
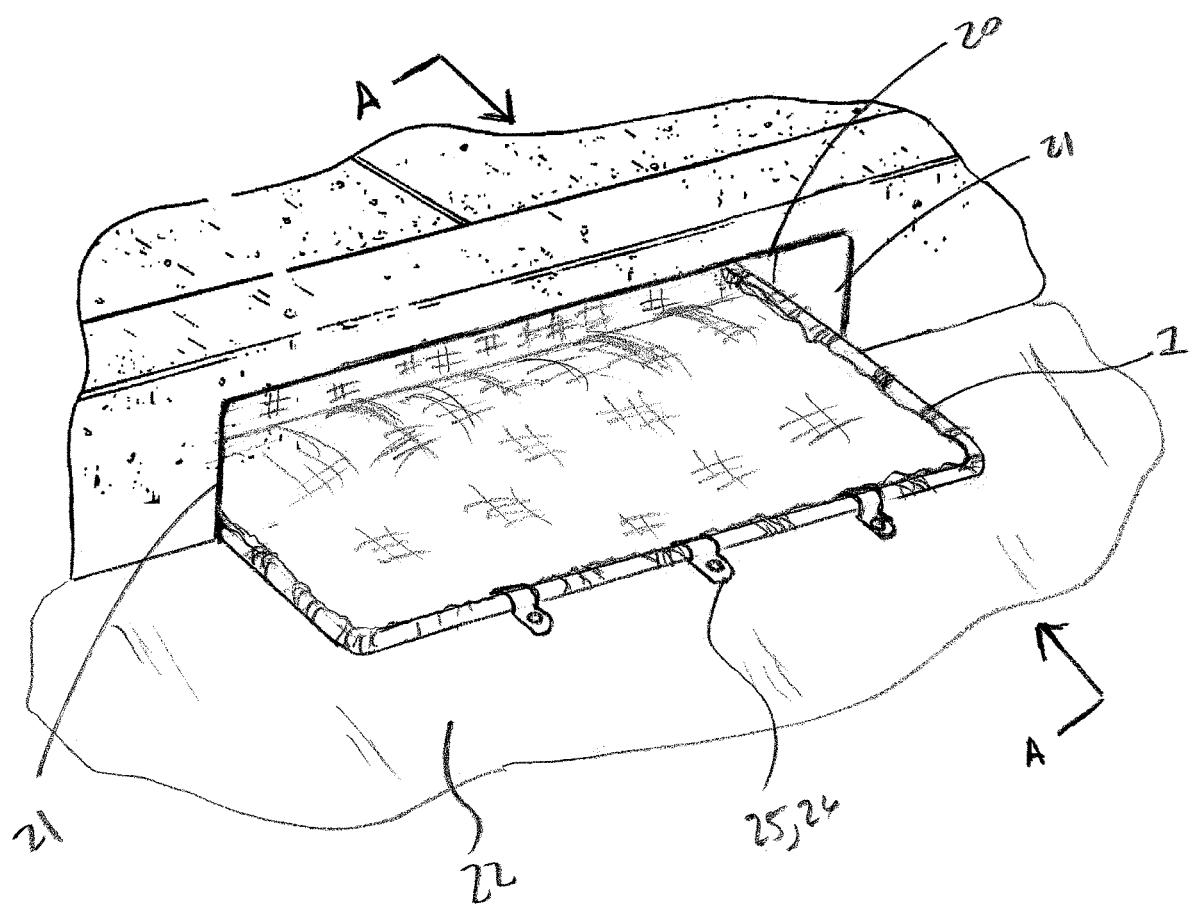
FIG. 3 is a perspective side view of a storm drain filter of the present invention installed on in a curb style storm water inlet.
Figure 4:
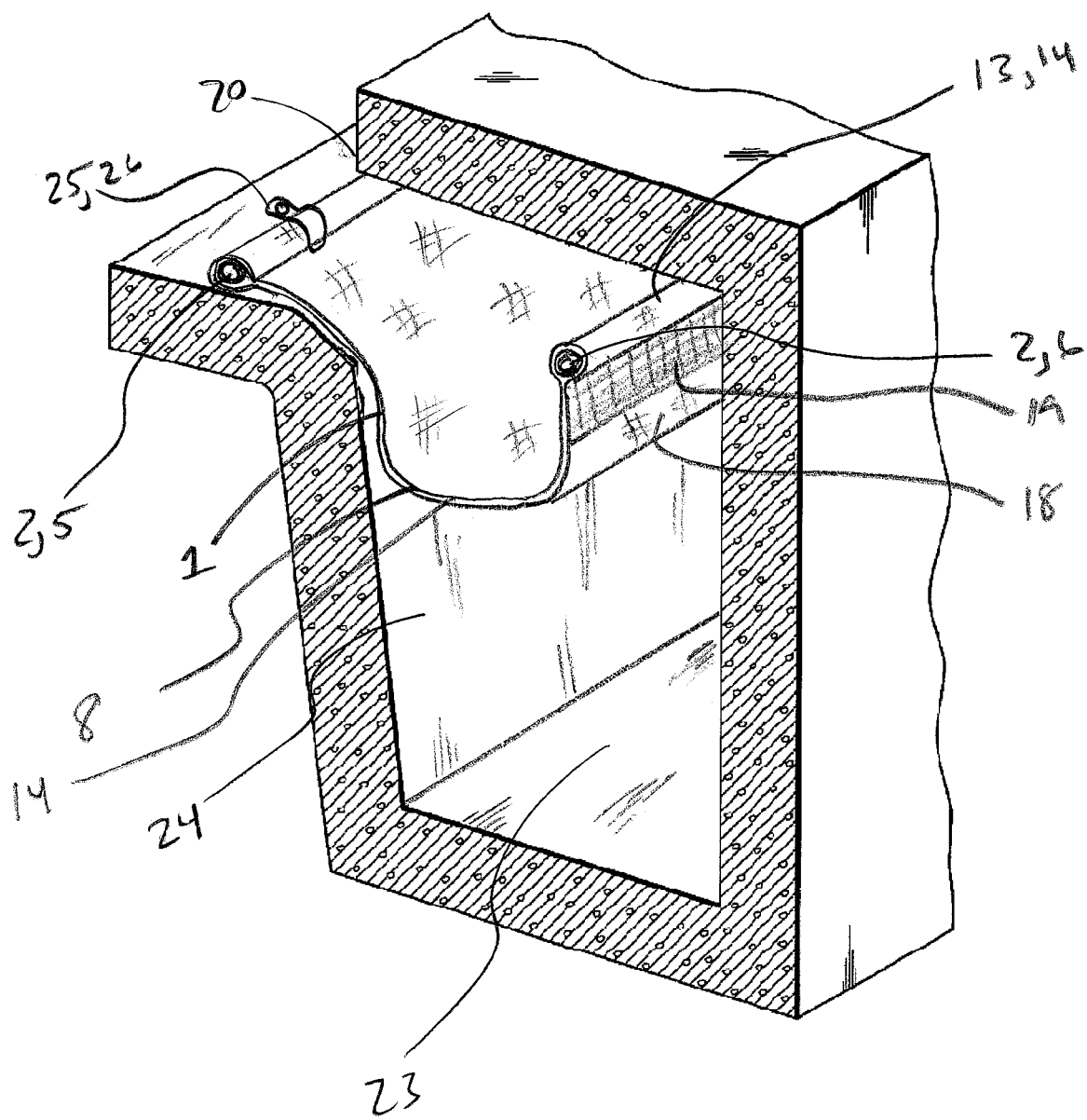
FIG. 4 is a cross sectional view along line A-A of FIG. 3 showing a storm drain filter of the present invention installed on in a curb style storm water inlet.

With reference to FIGS. 3 and 4, a perspective side view of a storm drain filter 1 of the present invention installed on in a curb style storm water inlet 20 and a cross sectional view along line A-A of FIG. 3 showing a storm drain filter 1 of the present invention installed on in a curb style storm water inlet 20, respectively, are illustrated. The frame and filter bag may be inserted into a curb style storm water or side inlet 20 and then expanded to fully fill the width of the side inlet 20, thereby resting side edges 7 of the frame 2 against side walls 21 of the side inlet 20. A front edge 5 of the frame 2 rests on a street surface 22 in front of the side inlet 20 while a rear edge 6 of the frame 2 extends through the side inlet 20 and into the storm drain 23 over a front wall 24 of the storm drain 23, thereby allowing the filter bag 8 to hang downward into the storm drain 23. The street surface 22 may be an extension of the side inlet 20 or other surface directly in front of the side inlet 20. The front edge 5 of the frame 2 is preferably secured to the street surface 22 in front of the of the side inlet 20 using at least one securing means 25, such as one or more clips 26, screws, concrete nails and/or equivalent securing means.

As water passes into the side inlet 20, the water passes over the front edge 5 of the frame 2 and filter bag 8 and falls into the filter bag 8 where any debris being carried by the water is trapped as the water passes through the filter bag 8 and into the storm drain 23.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

The invention claimed is:

1. A storm drain filter comprising:
   a rectangular-shaped telescoping tubular frame having two U-shaped halves in which a first U-shaped halve slides into a second U-shaped halve to allow the width of the frame to be increased or decreased;
   said frame having a front edge, a rear edge and side edges;
   said frame supporting a filter bag having an inner surface, an outer surface, and an upper perimeter edge surrounding an opening into the filter bag;
   said upper perimeter edge of the filter bag being attached to the frame via at least one sleeve located on the perimeter edge of the filter bag;
   said at least one sleeve allowing the first halve and the second halve of the frame to slide and change the width of the telescoping frame and the width of the opening of the filter bag;
   said filter bag having a rectangular-shaped main panel extending downward from the front edge of the frame and curving upward toward the rear edge of the frame;
   side panels each extending from the side edges of the main panel to the side edges of the frame;
   said filter bag being constructed out of a porous material capable of allowing water to drain through said porous material but catches small debris and pollutants; and
   a mesh panel located on the filter bag between the main panel and the rear edge of the frame directly below the rear edge of the frame wherein said mesh panel is capable of allowing water and pollutants to drain before reaching the upper perimeter edge of the filter bag.

* * * * *